United States Patent
Hagan

[19]

[11] Patent Number: 5,864,685
[45] Date of Patent: *Jan. 26, 1999

[54] INCREASING INCOME TRUST COMPUTER TRANSACTION SYSTEM AND INSURED INVESTMENT ACCOUNT SYSTEM

[76] Inventor: Bernard P. Hagan, 115 Commonwealth Ave., San Francisco, Calif. 94118

[*] Notice: The portion of the term of this patent subsequent to Jul. 10, 2012, has been disclaimed.

[21] Appl. No.: 203,214

[22] Filed: Feb. 28, 1994

[51] Int. Cl.$^6$ .................................................. G06F 17/60
[52] U.S. Cl. ........................ 395/235; 395/237; 395/236
[58] Field of Search .................................. 364/401, 408, 364/401 R; 235/379; 395/201, 235, 236, 237, 239

[56] References Cited

U.S. PATENT DOCUMENTS

| | | | |
|---|---|---|---|
| 4,774,663 | 9/1988 | Musmanno et al. | 364/408 |
| 4,953,085 | 8/1990 | Atkins | 364/408 |
| 4,985,833 | 1/1991 | Oncken | 364/408 |
| 5,291,398 | 3/1994 | Hagan | 364/408 |
| 5,297,026 | 3/1994 | Hoffman | 364/401 |

*Primary Examiner*—Robert A. Weinhardt
*Attorney, Agent, or Firm*—Robert C. Kain, Jr.

[57] ABSTRACT

This invention relates to a data processing system and computer-based data processing method for managing an investment account structure. According to some of the preferred embodiments, the account structure is made up of one or more annuity contracts or life insurance contracts, each of the contracts being owned by one or more individual subscribers. Premiums are paid for the contracts being invested in one or more depository accounts, insured by deposit insurance, at one or more financial institutions. According to another preferred embodiment, annuity contracts are structured in one or more irrevocable trusts, with each subscriber's principal and/or income placed in a trust corpus of one of the irrevocable trusts. Each subscriber has a primary beneficiary (usually the subscriber) and a secondary beneficiary. When a subscriber dies, the trust income is distributed to the remaining primary beneficiaries. When the last subscriber dies, the entire trust is distributed proportionally to the secondary beneficiaries.

14 Claims, 15 Drawing Sheets

INCREASING INCOME TRUST COMPUTER TRANSACTION SYSTEM AND INSURED INVESTMENT ACCOUNT SYSTEM

BACKGROUND OF THE INVENTION

The present invention relates to a system and a method for electronically processing transactional data and monitoring funds invested in one or more of annuity contracts or life insurance contracts such that the invested funds are protected by depositor's insurance, such as FDIC insurance.

Certain banking institutions, banks and savings and loans pay premiums such that money on deposit in those banking institutions is insured. For example, in the United States, the premiums are paid to an agency of the federal government (the Federal Deposit Insurance Corporation, or FDIC), and the institutions thus are federally insured. If the banking institution becomes insolvent for any reason, the FDIC pays the depositor for any losses up to an established insured limit. At present, deposits are insured up to $100,000.00. There is a regulation in the United States which provides that funds deposited by life insurance companies or a corporation solely to fund life insurance or annuity contracts will be insured up to the depositor's insurance limit ($100,000.00) per individual entitled to receive benefits under the contract. The persons entitled to receive benefits under an annuity contract or a life insurance are called herein contract "primary beneficiaries" whether those persons are classified as subscribers or customers (the individuals who invest in the contracts) or as other beneficiaries (other individuals).

An annuity contract is a contract that pays a primary beneficiary an amount at regular intervals or pays a primary beneficiary a lump sum at a predetermined time in the future. The annuity contract is funded or provided for by a subscriber. Essentially, the subscriber pays a certain amount of money to a company, the company invests that money, and the company at a certain time in the future or at regular intervals pays the primary beneficiary a prescribed amount as required under the annuity contract. Primary beneficiaries for annuity contracts are sometimes called "annuitants."

Similarly, a life insurance contract pays out a sum upon the death of a subscriber to primary beneficiaries.

If annuity contracts are structured as an irrevocable trust, the subscriber's principal and/or income is placed in a trust corpus. The total income of the trust corpus is distributed to all primary beneficiaries. Then as mortality reduces the number of primary beneficiaries, the trust income is distributed to fewer and fewer primary beneficiaries. When the last subscriber dies, the trust corpus is distributed to "secondary beneficiaries."

SUMMARY OF THE INVENTION

The present invention relates to a data processing system and method for implementing and administering an insured savings account structure. More particularly, there are five major preferred embodiments of this invention: (1) fixed annuity contracts, which may be tax-deferred annuities; (2) variable annuity contracts, which may be tax-deferred annuities; (3) ordinary life insurance contracts; (4) universal life insurance contracts; and (5) annuity contracts structured in an increasing income trust. These will be summarized below. The invention is also suitable for general types of life insurance contracts and other types of annuity contracts.

Fixed and Variable Annuity Contracts

A system and method according to the present invention can manage one or more fixed or variable annuity contracts. Fixed annuity contracts provide a guaranteed income over time. Variable annuity contracts have returns that may vary over time. Systems and methods according to these preferred embodiments are particularly useful for optionally providing individuals with retirement savings and benefits.

In particular, according to these embodiments, a data processing system for managing an investment account structure comprising one or more annuity contracts, each of the annuity contracts being owned by one or more individual subscribers, premiums paid for the annuity contracts being invested in one or more depository accounts, insured by deposit insurance, at one or more financial institutions. The system comprises: computer processor means for processing data; storage means for storing data on a storage medium; depository monitoring means for processing data representing the depository accounts insured by deposit insurance and for ensuring that deposit insurance requirements are met for all depositories and all subscribers; and payment tracking means for inputting data representing all transactions of the investment account structure and for computing ownership of a share of the investment account structure of each of one or more beneficiaries of each annuity contract.

Some types of annuity contracts are deferred annuity contracts. Deferred annuity contracts allow funds to be accumulated on a tax-deferred basis over the term of the contract and pay a lump sum or make periodic payments to annuitants at certain times in the future. For example, a subscriber may fund a deferred annuity and, upon retirement of the subscriber, the company holding the annuity pays the subscriber either a lump sum or periodic payments as selected by the annuitant. In this example, the contract is annuitized upon retirement of the subscriber. If the contract is surrendered during early years, there typically are surrender penalties. If there are partial withdrawals, penalties sometimes apply. Interest if withdrawn is reportable as income in the year of withdrawal.

In order to obtain the benefit of the depositor's insurance, the corporation holding the annuity must establish an internal account for the primary beneficiary and place the funds on deposit with a federally approved institution (e.g., a FDIC institution). However, the corporation can accumulate and combine investments for a number of annuity beneficiaries and invest that aggregate sum with a single approved institution, such as a bank. The regulations provide that, in the event the banking institution becomes insolvent, the federal agency providing the depositors' insurance will pay for losses sustained by a particular primary beneficiary provided those losses do not exceed the established depositor's insurance limit value.

Tax-deferred annuities are presently being marketed throughout the United States by life insurance companies. Tax law currently allows interest earnings in tax-deferred annuity accounts to accumulate tax free until withdrawn. Consequently, this form of annuity has become a popular investment, particularly for those saving for their retirement years. However, funds invested in deferred annuities are not federally insured. There have been losses suffered by purchasers of annuities due to the inability of some insurance companies to remain solvent. This is particularly devastating for anyone depending on annuity income for support during retirement years. In addition, elderly persons and persons of all ages currently retired and planning retirement are greatly concerned that they will not have enough money to live on in their old age. The costs of many essentials continue to increase: housing, food, fuel, etc. Health care costs, particularly, are worrisome, and especially costs for extended hospitalization or nursing care.

It would be a great benefit if the features of annuities (ordinary or tax-deferred) could be combined with federal deposit insurance. In the United States, for example, there are provisions in the law that are designed to permit funds used to purchase annuity contracts (or life insurance contracts) to receive FDIC insurance. However, there are problems in administering a system and method for managing insured deposits.

For example, the absolute security of total FDIC insurance coverage for all the system's subscribers must be maintained by investing all premiums only in FDIC insured deposit contracts with FDIC insured depository institutions. The commingled investments of all the subscribers must be monitored so that no one subscriber ever has an investment in one depository that exceeds the FDIC insurance limit.

Life Insurance Contracts

According to two other preferred embodiments, a system and method according to the present invention manages one or more ordinary or universal life insurance contracts. These embodiments are analogous to the preceding embodiments and address similar administrative problems, with ordinary life insurance contracts analogous to fixed annuity contracts and with universal life insurance contracts analogous to variable annuity contracts. However, unlike the previous embodiments, life insurance contracts cannot be used to establish retirement account structures.

In particular, according to these embodiments, a data processing system is provided for managing an investment account structure comprising one or more life insurance contracts, each of the life contracts being owned by one or more individual subscribers, premiums paid for the life insurance contracts being invested in one or more depository accounts, insured by deposit insurance, at one or more financial institutions. The system comprises: computer processor means for processing data; storage means for storing data on a storage medium; depository monitoring means for processing data representing the depository accounts and for ensuring that deposit insurance requirements are met for all depositories and all subscribers; and payment tracking means for inputting data representing all transactions of the investment account structure and for computing ownership of a share of the investment account structure of each of one or more beneficiaries of each life insurance contract.

Increasing Income Trust

According to another preferred embodiment of the invention, the disclosed system and method may also be used to administer accounts set up as irrevocable trusts. Each subscriber invests in an annuity contract and is assigned, along with a limited number of actuarially similar other subscribers, to an irrevocable trust. The data processing system typically will assign the subscriber as a primary beneficiary to an irrevocable trust consisting of one or more individuals of similar actuarial characteristics and equal investment. The trust corpus is funded with the annuity contract principal and/or the annuity contract income of subscribers. Each of the primary beneficiaries (typically the subscribers themselves, but possibly other individuals) receive payments from the trust income. As each subscriber dies, the trust income is distributed to the remaining primary beneficiaries. When the last subscriber dies, the trust corpus is distributed proportionally to secondary beneficiaries, typically the heirs of the primary beneficiaries. Such a system and method presents further administrative problems that must be addressed.

In particular, according to this embodiment, a data processing system is provided for managing an investment account structure comprising one or more annuity contracts and one or more irrevocable trusts, each of the annuity contracts being owned by one or more individual subscribers, with each subscriber's principal and/or income placed in a trust corpus in one of the irrevocable trusts, and with premiums paid for the annuity contracts and principal of the trusts being invested in one or more depository accounts, insured by deposit insurance, offered by one or more participating depository institutions. The system comprises: computer processor means for processing data; storage means for storing data on a storage medium; depository monitoring means for processing data representing the depository accounts and for ensuring that deposit insurance requirements are met for all depositories and all subscribers; payment tracking means for processing data representing all transactions of the investment account structure and for computing each subscriber's percentage ownership of the investment account structure; and trust payment means for computing, upon the death of each subscriber, the payments to each remaining subscriber's primary beneficiaries from the proper trust and for computing, upon death of a last subscriber, the pro rata distribution to each secondary beneficiary from the proper trust.

Other objects and embodiments of the invention, its nature, and various advantages will be apparent to those of skill in the art from the accompanying drawings and the following detailed description of the invention.

DESCRIPTION OF THE PREFERRED EMBODIMENTS

A number of implementations of the preferred embodiments will be apparent to those of skill in the art from the following descriptions of the cases of (1) a system and method for annuity contracts (which is analogous for life insurance contracts) and (2) a system and method for annuity contracts structured as an irrevocable trust. Skilled artisans will be able to recognize those features that are optional or inapplicable for either case, thus excluding, for example, features incompatible with a trust when implementing a system and method for an irrevocable trust structure. The example of FDIC insurance is used throughout, and the primary beneficiary is assumed to be the subscriber.

Figure 1:
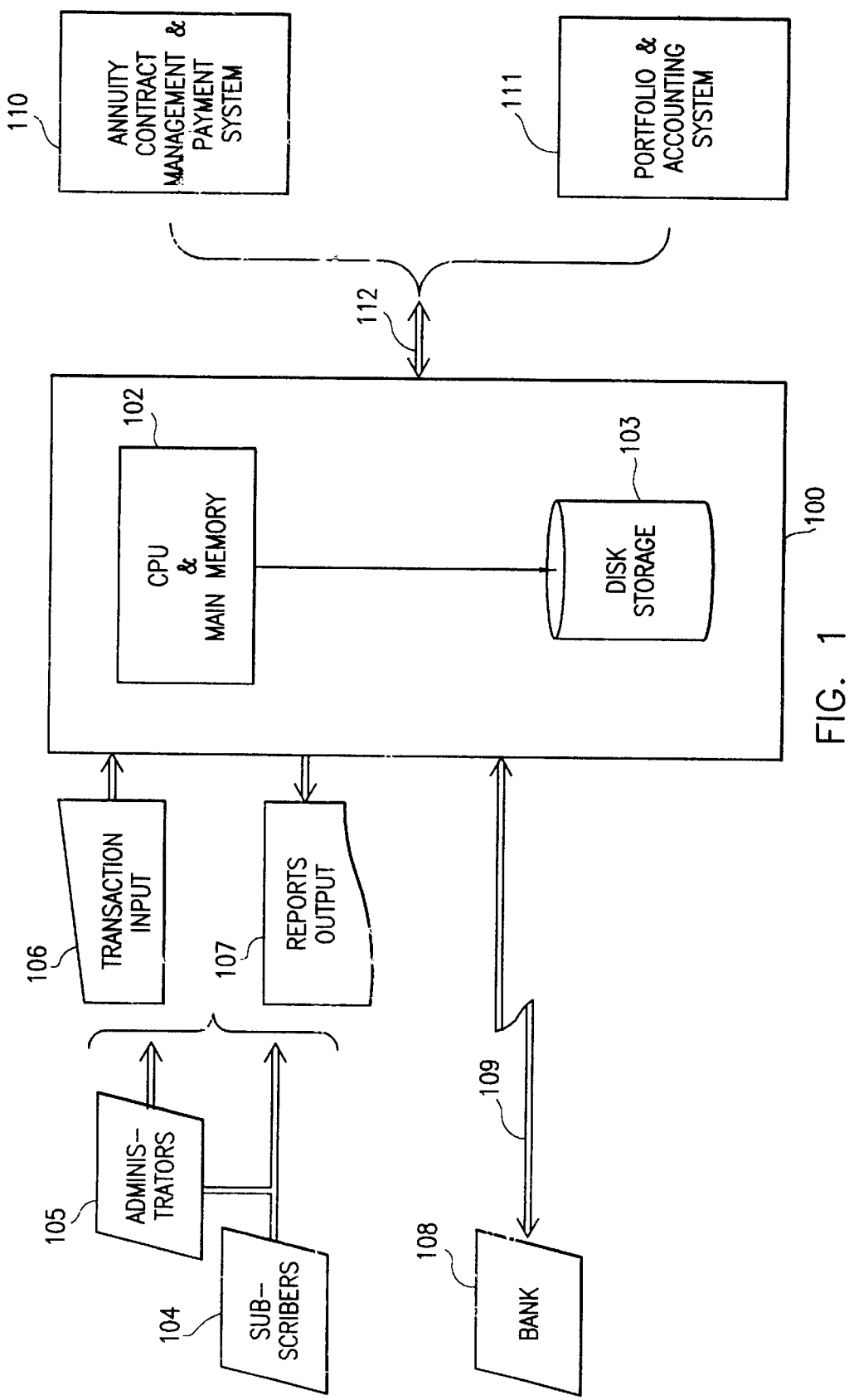
FIG. 1 is a schematic diagram depicting the flow of information using a data processing system according to the present invention.

The data processing system and method according the present invention is depicted as part of the schematic diagram of FIG. 1. Computer 100 comprises central processing unit and main memory (CPU) 102 and disk storage 103. Computer 100 may be, for example, a single sufficiently powerful computer or a network of computers jointly of sufficient power.

Data and instructions that implement the process and method are stored in disk storage 103. The data are preferably maintained in entity records that include descriptive data as shown in Table 1. The data can be organized as files, relational databases, or other equivalent structures.

TABLE 1

| ENTITY RECORD | TYPICAL DESCRIPTIVE DATA |
|---|---|
| (1) Subscriber Record | Name; address; ultimate beneficiaries; Actuarial data; Annuity contract(s) owned; Value of subscribers total investment; Percent subscriber owns; Net of all payments to and from the system |
| (2) Annuity Contract Record | Owning subscriber; Contract terms; Payment history; principal value. |
| (3) Trust Record (for trust embodiment) | List of all assigned subscribers; Payment history; principal value. |
| (4) Depository Record | Name; address; Deposit contract terms offered; List of deposit contracts accepted; Net deposit balance. |
| (5) Deposit Contract Record | Depository; Current or redeemed; Terms of deposit; Payment history; principal value. |
| (6) System Record | Current date; Total value of the system; Total income for this period; Funds available to invest. |

The instructions are processed by CPU 102 and are broken into cooperating modules. A preferred functional decomposition is listed in Table 2. The instructions can be written in procedural, database, object oriented, or other equivalent computer language.

TABLE 2

| FUNCTIONAL MODULE | TYPICAL FUNCTIONAL CONTENT |
|---|---|
| (1) Storage maintenance | Creates storage areas on the storage media; accepts transaction input data and updates storage areas; deletes storage areas. |
| (2) Payment tracking | Accepts payment data from annuity contract and portfolio/accounting systems; computes each subscriber's percentage ownership and funds available to investment. |
| (3) Trust payment (for trust embodiment) | Computes trust interest income; generates orders to portfolio/accounting system to pay proportionate amount to surviving beneficiaries |
| (4) Depository monitoring | Monitors total deposits to assure no subscriber's investment exceeds the FDIC limit in any depository; generates orders to portfolio/accounting system to sell deposits if limits exceeded. |
| (5) Bidding | Periodically solicits from each depository data representing its highest yielding or most attractive deposit contract offers. |

TABLE 2-continued

| FUNCTIONAL MODULE | TYPICAL FUNCTIONAL CONTENT |
|---|---|
| (6) Investment | Invests funds available; generates orders to portfolio/accounting system to buy the most attractive deposit contracts. |
| (7) Reporting | For each file or database, generates exception, detail and summary reports. |

Skilled artisans will recognize those functional modules that are optional. In addition, alternative, equivalent organizations of data and instructions will be apparent to those skilled in this art.

The other elements of FIG. 1 depict the data flow environment of a system and method according to the invention. Subscribers 104 typically correspond with one or more administrators 105 who enters their requested transactions into the system. In a networked implementation, subscribers may deal directly with the system via home terminals. The administrators also enter transactions describing FDIC insured depositories 108, and annuity contracts, and is responsible for correct system functioning and auditing system transactions. The entering of transactions by administrators 105 is indicated at block 106, which could be a terminal or other input device. The system produces reports, as indicated at block 107, for administrators and subscribers in any convenient output form.

The system obtains data describing the deposit contracts offered by the FDIC insured depositories 108 via communications link 109. Preferably, 109 is an automatic telecommunications link. Alternatively, it could also require manual steps.

The system utilizes associated data processing subsystems that are known in the prior art. Annuity contract system 110 is a subsystem for managing annuity contracts, receiving premium investments, making annuity payments, and tracking principal value. Portfolio and accounting system 111 is a subsystem for managing the insured deposit contracts, interest income, and cash on hand. These subsystems may be implemented on computer 100. Alternatively, they may reside on a separate computer system communicating via communications link 112 with computer 100. In either implementation, annuity contract system 110 receives from computer 100 data describing annuity contracts and sends to computer 100 data describing payment history and principal value of the annuity contracts. Portfolio and accounting system 111 receives from computer 100 data describing orders to buy or sell particular deposit contracts and sends to computer 100, data describing income history and principal value of outstanding contracts.

Figure 2:
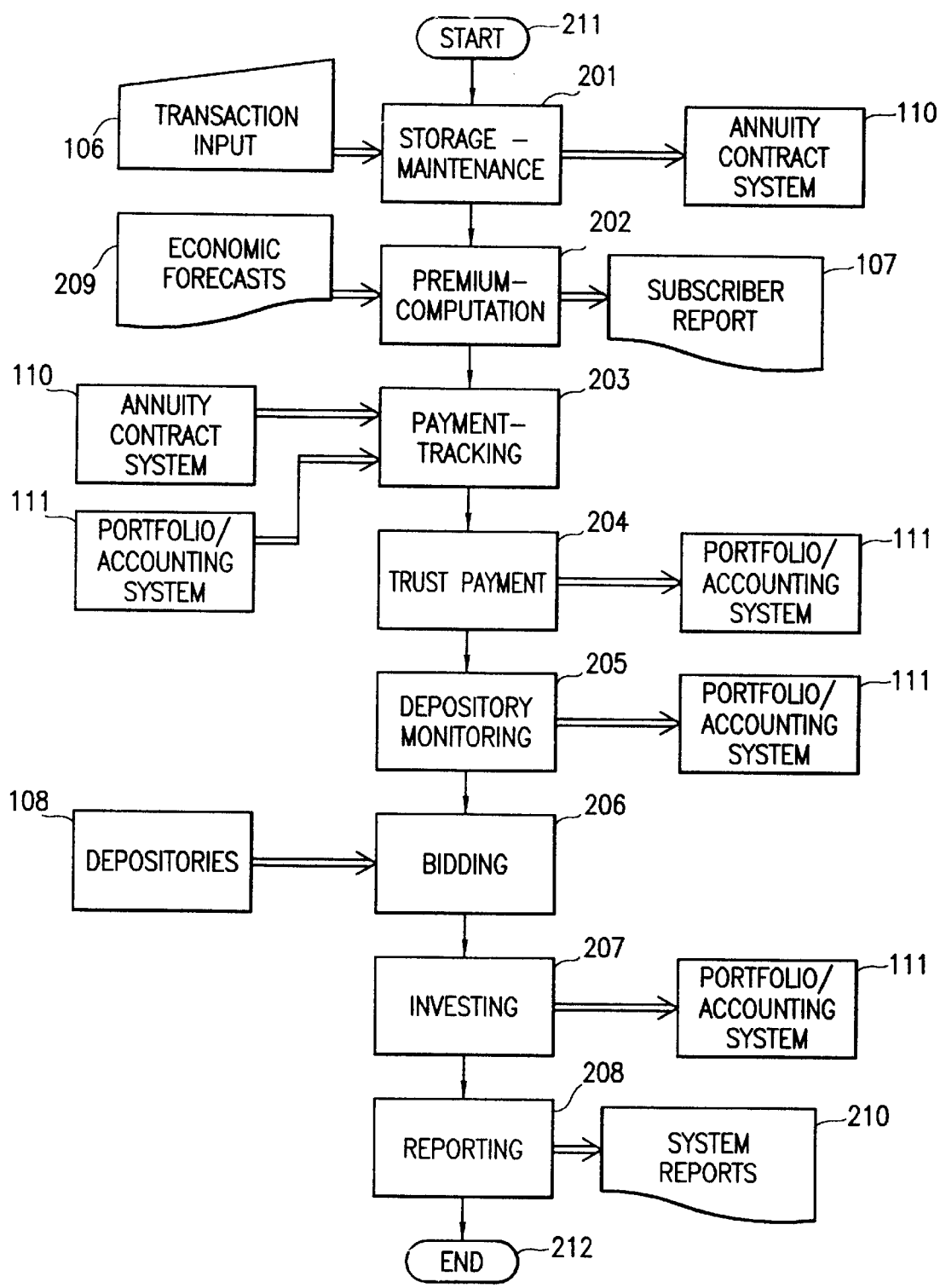
FIG. 2 is a flowchart of system functioning in a data processing system according to the present invention.

FIG. 2 illustrates both the sequence of operations of a system according to the invention and the flow of external data into and out of the system. The function of processes at blocks 201 to 208 are described in Table 2, rows 1 to 8, respectively. If a system according to the present invention does not implement the trust feature, trust payment process 204 will not be present, nor will the pieces of any other process that are identified to process data representing trusts.

After one or more input transactions have been gathered as indicated at block 106, the system starts processing at block 211 and continues to storage maintenance process 201, where data is input to disk storage 103. After one or more transactions have been input at block 201, the succeeding processes, at blocks 202 to 208, are performed in the order illustrated. The system stops at block 212. Preferably, these processes would be performed at an appropriate interval, at least monthly but perhaps weekly or daily, depending on the frequency of transaction input, annuity and income payments, and other system events.

Figure 3:
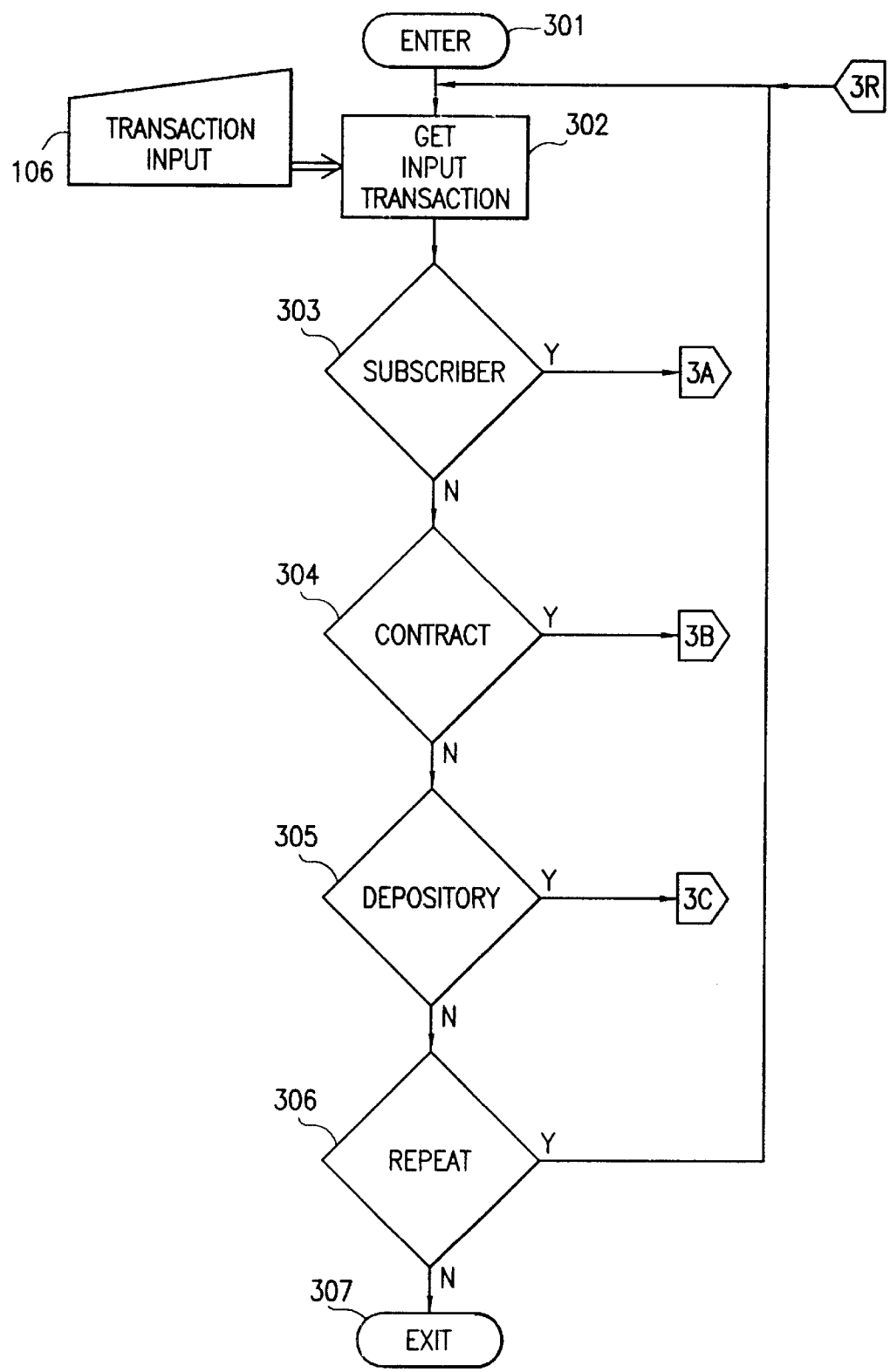
FIGS. 3, 3A, and 3B are flowcharts depicting storage maintenance means processing, with FIG. 3A further depicting the processing of subscriber transactions and FIG. 3B further depicting annuity contract and depository transactions.

A detailed description of the storage maintenance means is depicted in FIG. 3. Storage maintenance means processing begins at block 301 and ends at block 307, after which the system proceeds to the next sequential process. Transaction data is input as indicated at block 106 for processing at block 302. At block 303, the system checks if the transaction is for a subscriber. If so, processing proceeds, as indicated label 3A, to continue as described in FIG. 3A. If not, as indicated at blocks 304 and 305, the system checks for annuity contract or depository transactions, respectively, and proceeds, as indicated at labels 3B or 3C, respectively, to continue as described in FIG. 3B. If the administrator requests a repeat, as indicated at block 306, the system will branch to data input at block 302, or else storage maintenance processing exits at block 307.

Figure 3A:
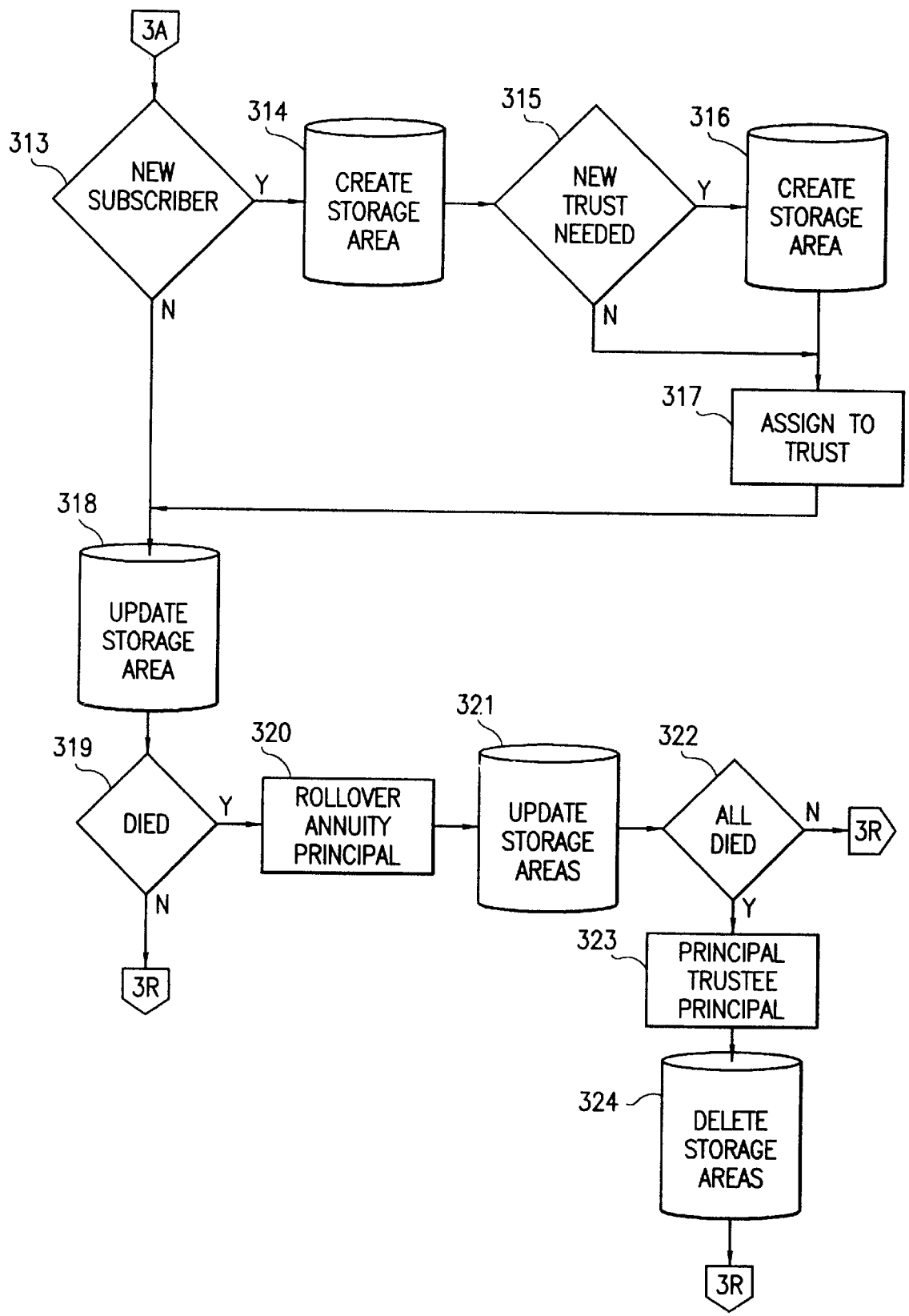

Now referring to FIG. 3A, if a subscriber transaction has been input, at block 313 the system checks for a new subscriber. If so, then a new storage area for this subscriber is created at block 314 to contain data similar to that listed in Table 1, row 1. If trusts are being used, then the new subscriber must be assigned to a trust. At block 315, the system checks if a new trust is needed, and if so a new storage area for this trust is created at block 316 to contain data similar to that listed in Table 1, row 3. The process indicated at block 318 updates these new storage areas.

Process at block 317 assigns the new subscriber to a trust, which preferably consists of up to approximately 200 other subscribers (each with a primary beneficiary) with similar actuarial characteristics and equal investments.

At block 319, the system checks for a transaction indicating the death of a subscriber. If not, subscriber transaction processing is complete. If so, the trust income is distributed among the remaining primary beneficiaries, as indicated at block 320. This requires trust and annuity contract storage area update at block 321.

The system performs a further test at block 322 by fetching all the subscriber storage areas assigned to the trust updated at blocks 320 and 321 and checks to determine if all subscribers have died. If not, processing is complete, an the system returns, as indicated at label 3R, to continue as indicated in FIG. 3. If so, then this trust must be terminated, as indicated at block 323; specifically, the trust corpus is distributed ratably to the secondary beneficiaries specified by the subscriber areas tested at block 322. Then, at block 324, all data areas for this trust and these subscribers are deleted from the storage means.

Figure 3B:
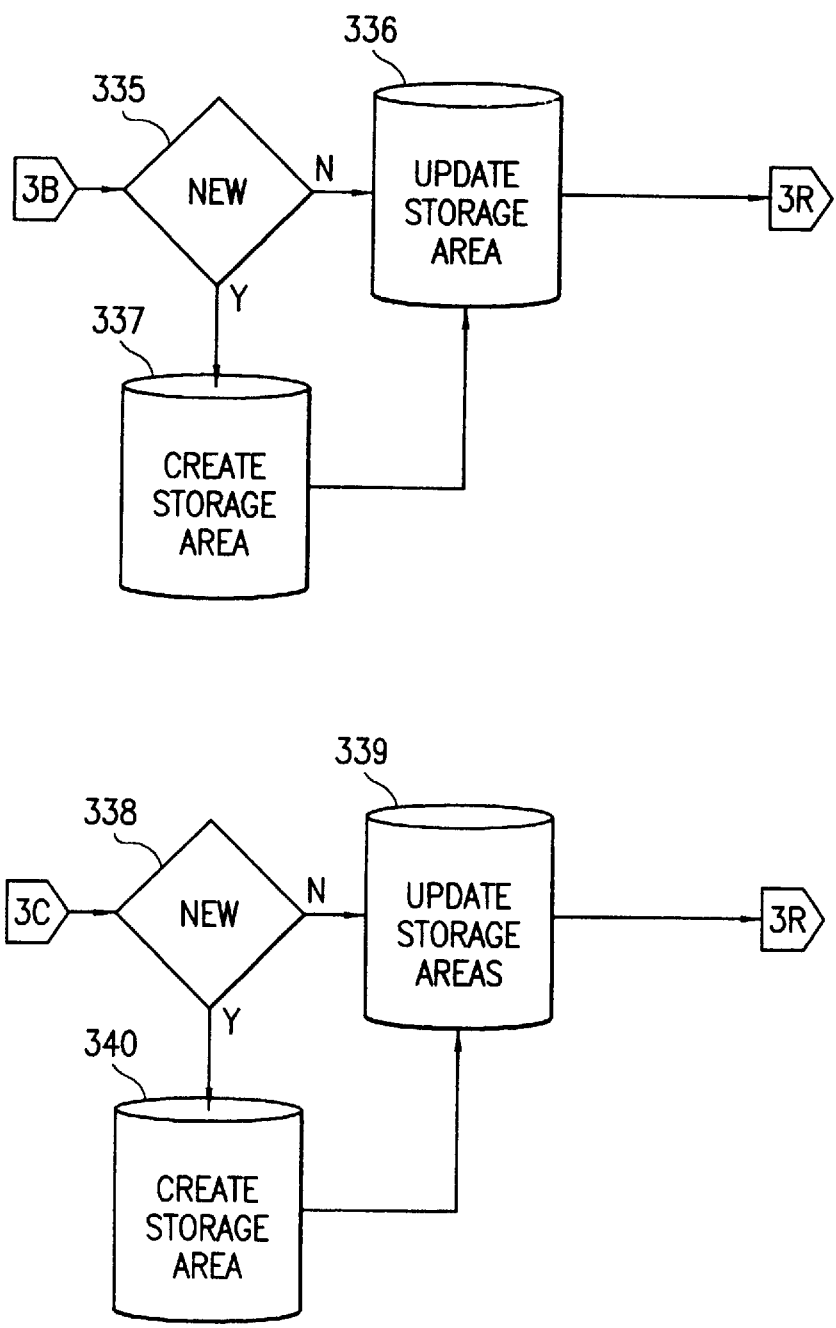

Turning now to FIG. 3B, if an annuity contract transaction has been detected, processing continues at connector 3B. At block 335, the system checks for a new annuity, and if so, a new storage area for this annuity is created by 337 to contain data similar to that listed in Table 1, row 2. An annuity transaction will occur when a subscriber purchases a contract. Finally, as indicated at block 316, the system updates the annuity contract storage area with the input data.

If a depository transaction has been detected, processing continues as indicated at label 3C. At block 338, the system checks for a new depository, and if so, a new storage area for this depository is created at block 340 to contain data similar to that listed in Table 1, row 4. A new depository will occur when the administrator decides to do business with a new institution and enters a transaction containing descriptive data. Finally, as indicated at block 339, the system updates the depository storage area with the input data. Processing then returns to FIG. 3, as indicated at label 3R.

Figure 4:
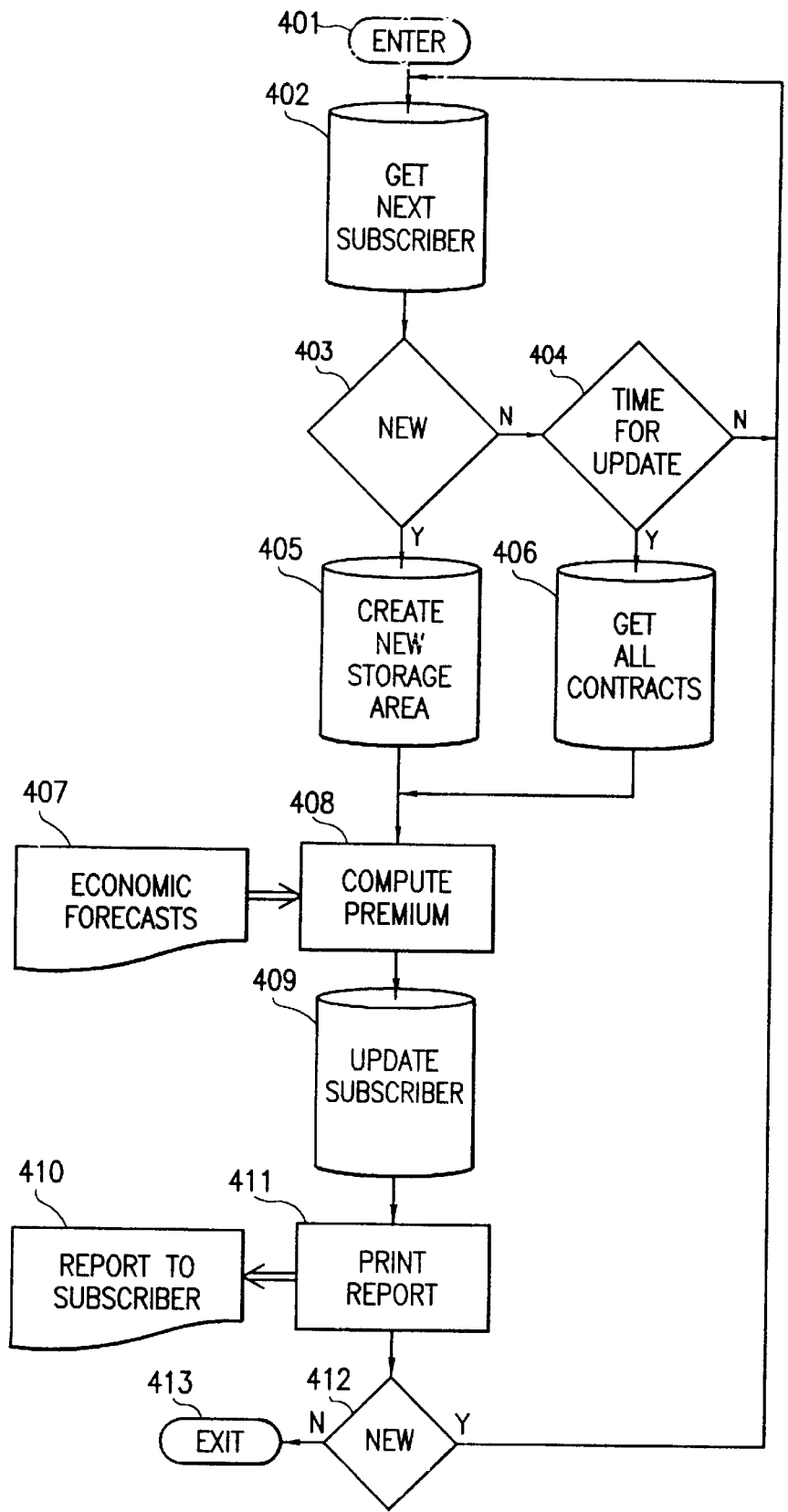
FIGS. 4 and 4A–C are flowcharts depicting processing the payment tracking means and the processing of a principal paid input from the portfolio/accounting system.

A detailed description of the payment tracking means is depicted in FIG. 4. Payment tracking means processing begins at block 501 and ends at block 533, after which the system proceeds to the next sequential process. Data input 502 and the test at block 504 implement a loop to extract all annuity contract payment data accumulated for this period from annuity contract system 110. Payment data updates the storage area for the particular annuity contract at block 503.

Data input at block 505 and the test at block 509 implement a loop to extract all portfolio and accounting payment data accumulated for this period from portfolio and accounting system 111. At blocks 506, 507, and 508, the system determines whether the payment is income received, principal paid to a depository, or principal received from a depository, respectively. For income received, as indicated at block 510, the system updates the payment history in the storage area for the particular deposit contract involved. Then, at block 511, the system accumulates the total income received by the benefit structure in this period by summing the income for all deposit contracts. This information updates the system record, which contains data similar to Table 1, row 6.

Figure 4A:
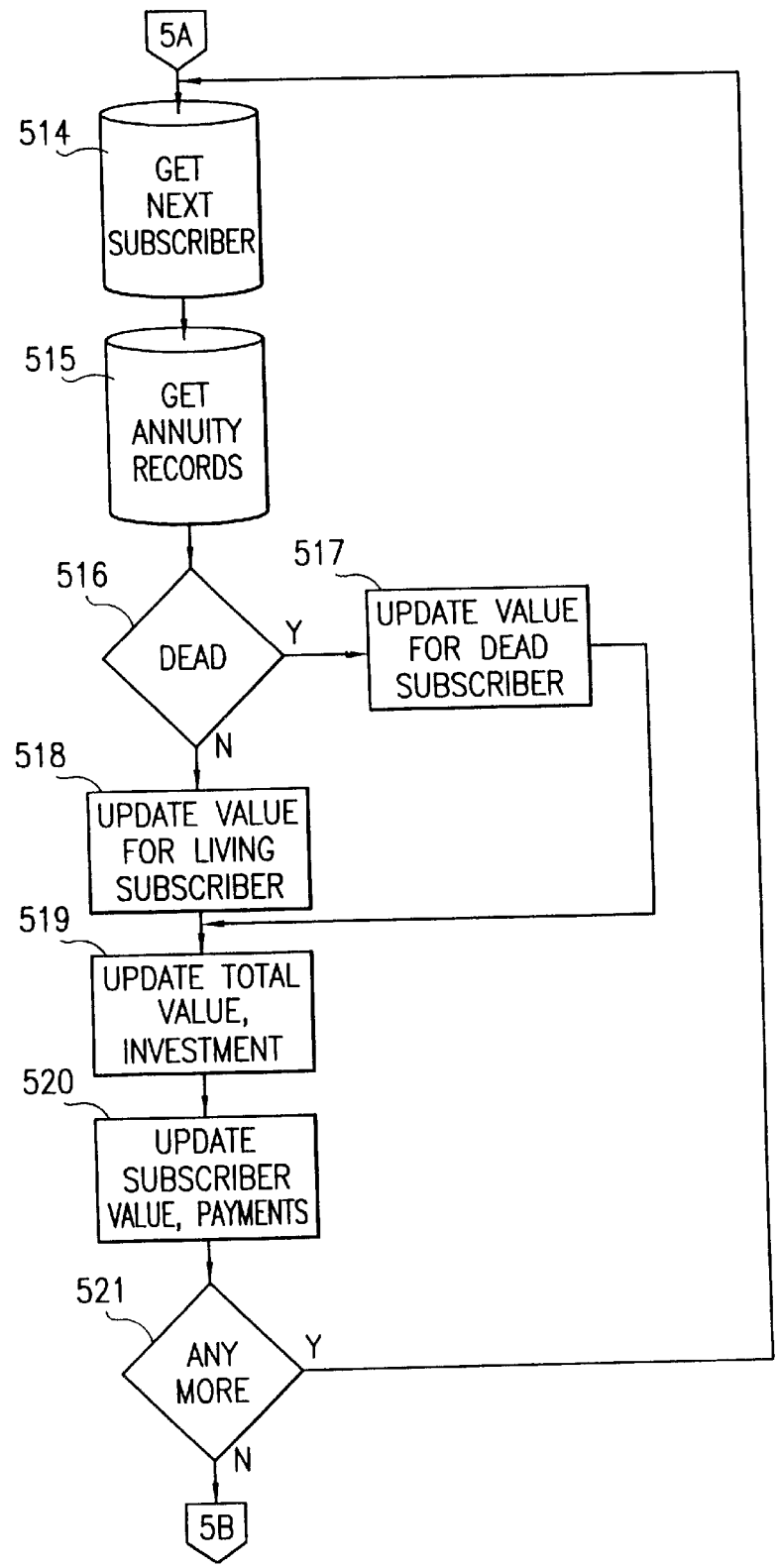
Figure 4B:
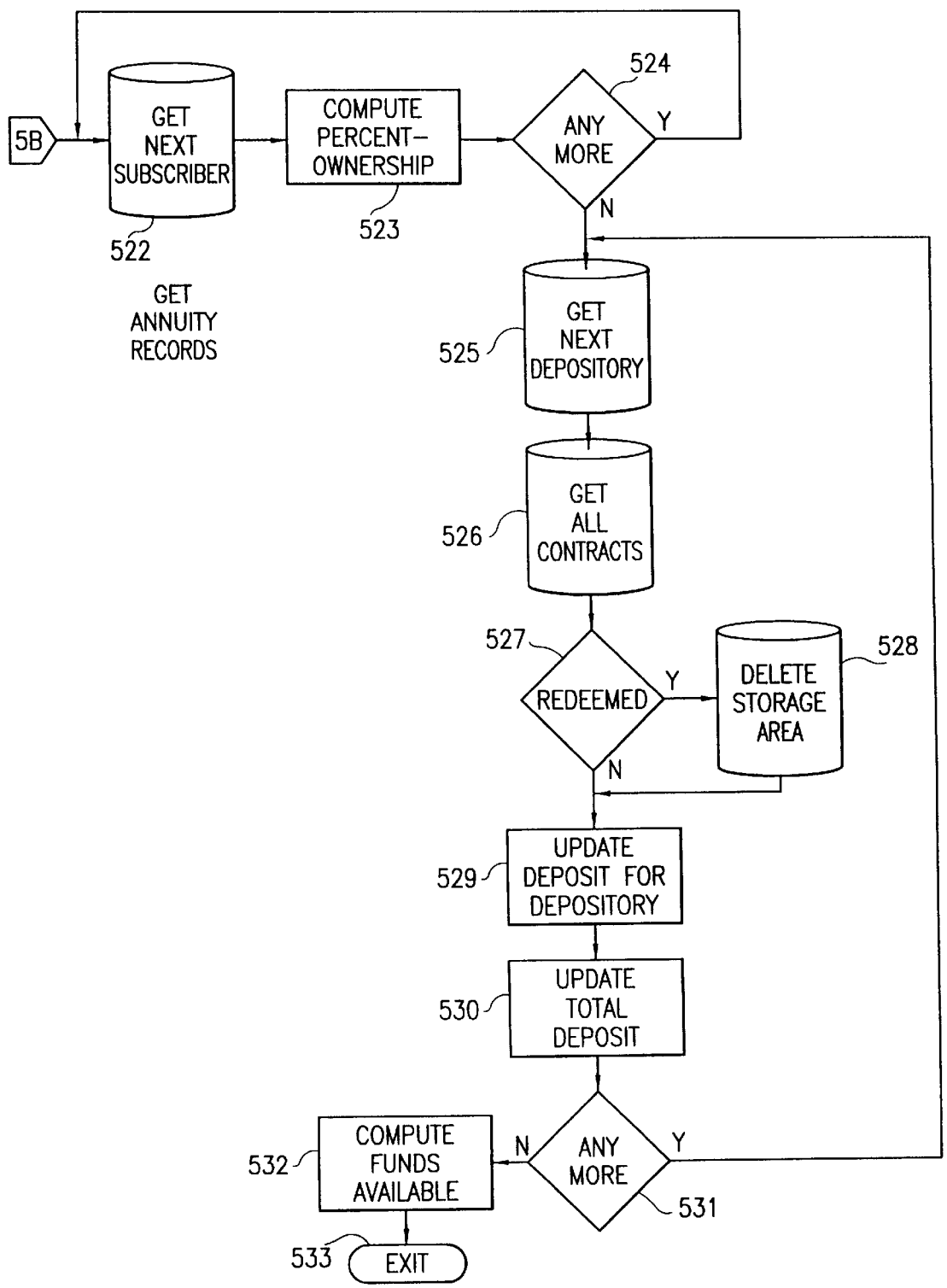
Figure 4C:
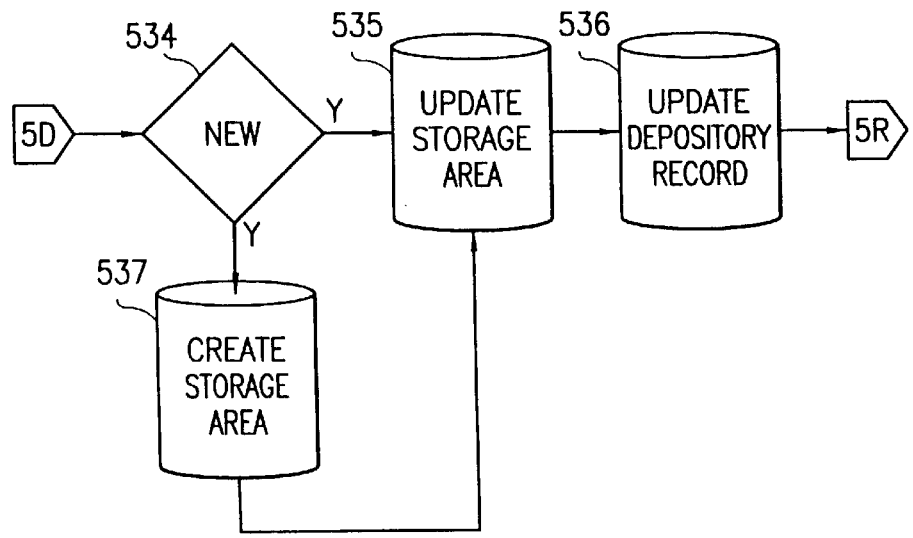

FIG. 4C depicts system processing for principal paid to a depository. At block 534, the system determines whether this represents an investment in a new deposit contract, and if so, a new storage area for a deposit contract is created at block 537 to contain data similar to that listed in Table 1, row 5. Then the deposit contract storage area is updated at block 535 and the depository storage area is updated at block 536 to reflect the new increased balance. For principal received from a depository, as shown in FIG. 4, the depository storage area is updated at block 512 to reflect the new decreased balance and the deposit contract record storage area is marked redeemed at block 513.

Turning now to FIG. 4A, beginning with a storage area fetch as indicated at block 514, the system proceeds through block 521 to implement a scan of all subscriber storage areas stored in disk storage 103. For each subscriber area, process steps as indicated at blocks 515 to 520 are performed to determine the current value of each subscriber's total investment in the benefit structure, the total value of the benefit configuration, and the net total of all subscriber payments. All the subscriber's annuity contract storage areas are fetched at block 515. Subscriber net total payment is computed from these areas. The value of the investment of a dead subscriber, tested at block 516, is simply the final principal balance of all owned annuity contracts, which is updated at block 517. For a living subscriber, the current value of all annuity contracts is computed, by means known to those of skill in the art, at block 518. At block 520, the subscriber total investment current value and net payments are updated. At block 519, all the subscriber values and payments are summed to obtain the total value of the investment structure and the total net payment into the structure. These values update the system record.

Payment tracking means processing continues as depicted in FIG. 4B. Beginning with a storage fetch at block 522, the system proceeds through block 524 to implement another subscriber storage area scan during which each subscriber's percentage ownership of the benefit structure is computed at block 523. This is simply done by dividing the value of each subscriber's investment by the total value of the structure.

Beginning with a storage area fetch at block 525, the system proceeds through block 531 to implement a scan of all depository storage areas stored in disk storage 103. For each depository area, process steps at blocks 526 to 530 are performed to determine the current deposit at each depository and the total deposits made by the benefit structure. This is simply done by fetching all deposit contracts for a depository, as indicated at block 526. If a contract is marked redeemed, at block 527, its storage area is deleted at block 528. The total of all deposits from all the deposit contracts updates the depository record at block 529. The depository totals are then summed to compute the total system deposit at block 530. This information updates the system record.

Finally the funds available for investment are computed at block 532 as the difference from the total net payments to the structure, from block 519, and the total deposits, from block 530. This information also updates the system record.

Figure 5:
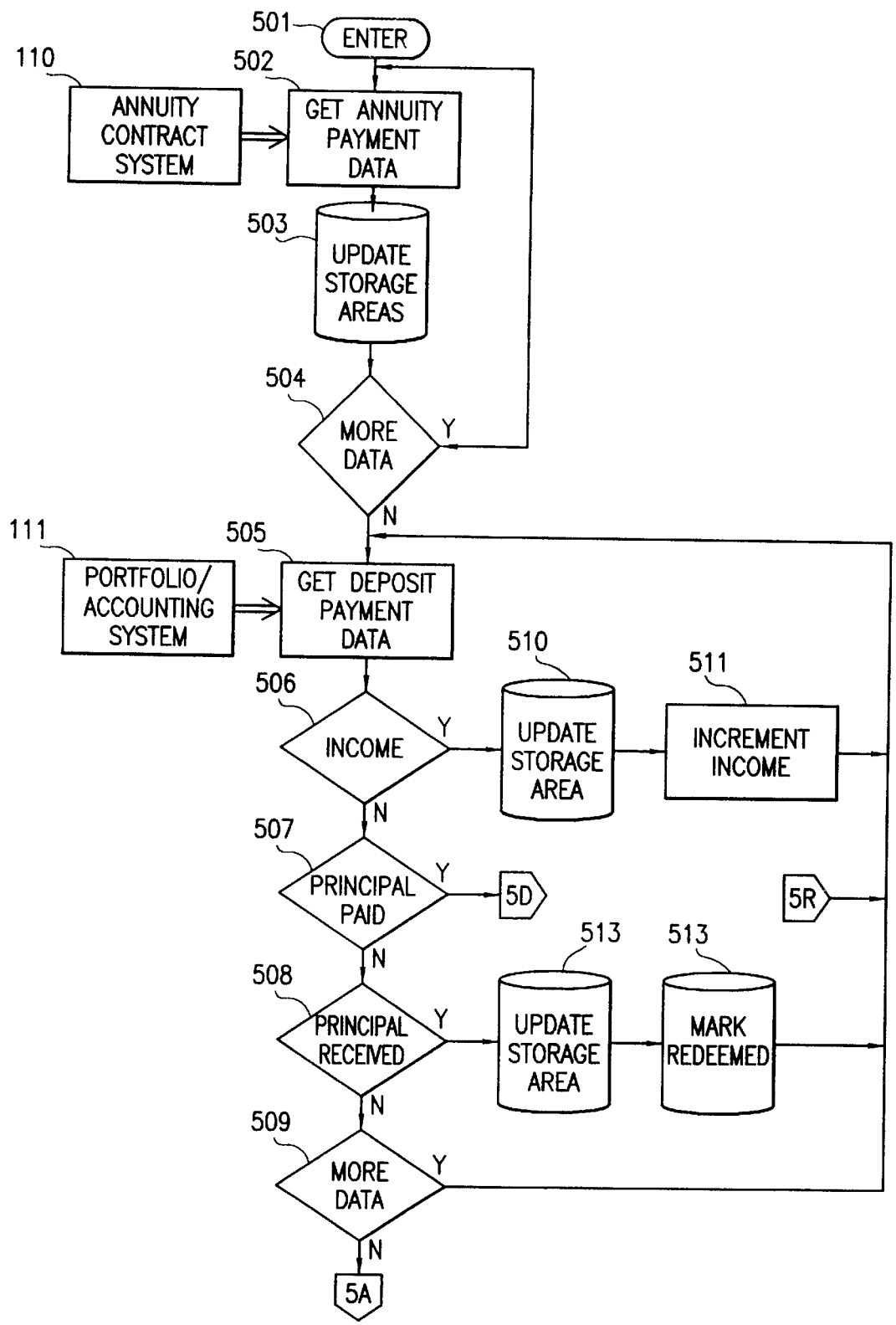
FIG. 5 is a flowchart depicting trust payment means processing.

A detailed description of the trust payment means is depicted in FIG. 5. Trust payment means processing begins at block 601 and ends at block 609, after which the system proceeds to the next sequential process. Beginning with a storage area fetch at block 602, the system proceeds through block 608 to implement a scan of all trust areas stored in disk storage 103. For each trust area, process steps at blocks 603 to 607 are performed.

At block 603, the system computes the particular trust's percentage ownership of the benefit structure by dividing the trust's principal value by the total value of the benefit structure (from the system record). The income allocated to this trust is computed by multiplying this percentage by the total income for this period (from the system record), as indicated at block 604. Next, at block 605, the system fetches storage areas for all living subscribers assigned to this trust; at block 606, the system divides the allocated trust income ratably among these subscribers; and at block 607, the system generates data representing payment orders to pay such amounts to the subscribers. This data is transferred to portfolio and accounting system 111, to carry out these financial actions.

Figure 6:
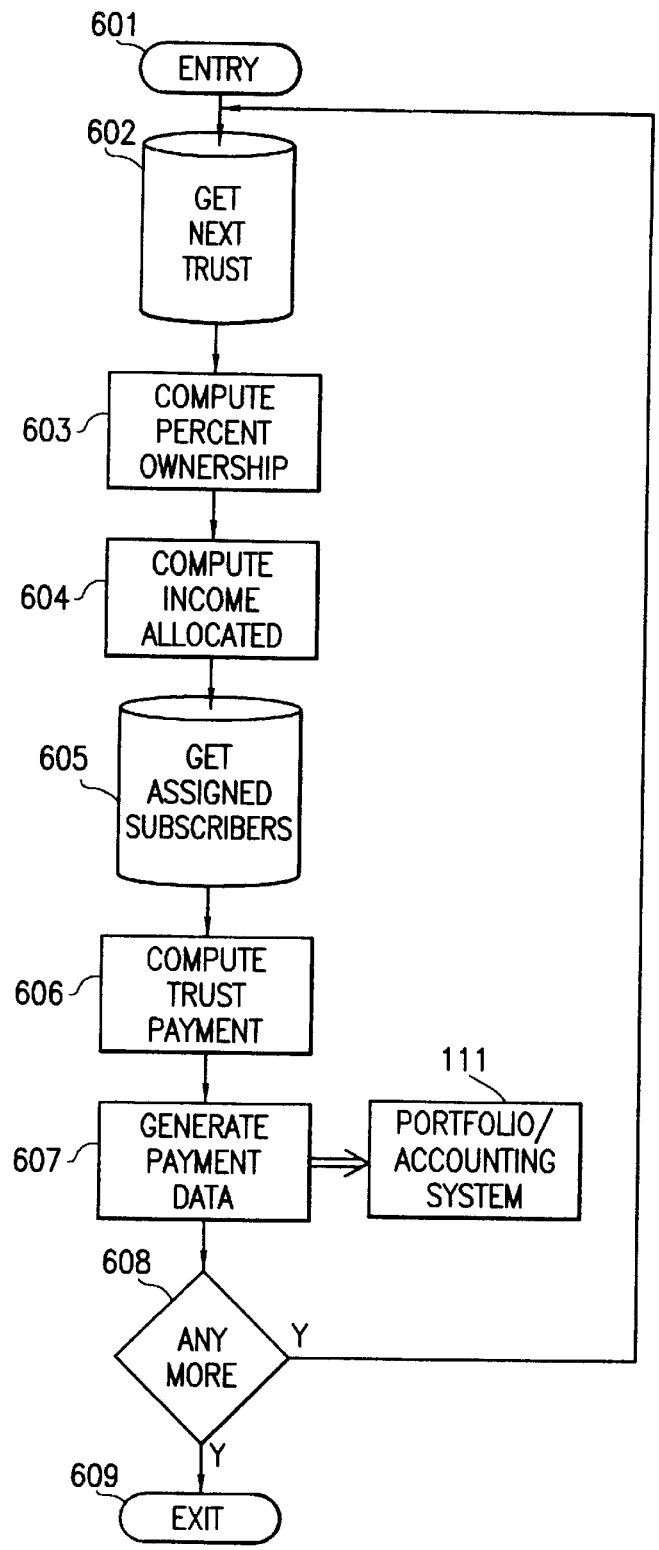
FIG. 6 is a flowchart depicting depository monitoring means processing.

A detailed description of the key depository monitoring means is depicted in FIG. 6. Depository monitoring means processing begins at block 701 and ends at block 709, after which the system proceeds to the next sequential process. Beginning with a storage area at block fetch 702, the system proceeds through block 708 to implement a scan of all depository areas stored in disk storage 103. For each depository area, process steps at block 703 to 707 are performed.

At block 703, the system obtains the subscriber storage area with the maximum percentage ownership of the investment structure. (These percentages were computed at block 523). This percentage multiplied by this particular depository total deposit is computed at block 704. This must be less than the FDIC limit (currently $100,000) in order that all subscribers be completely covered by FDIC insurance at this depository, as indicated at block 705. If this test is not met, at block 706 the system generates data representing deposit contract sell orders which will redeem sufficient deposit contracts such that this limit will be met. This sell order data is transferred to portfolio & accounting system 111 to carry out these financial actions.

Figure 7:
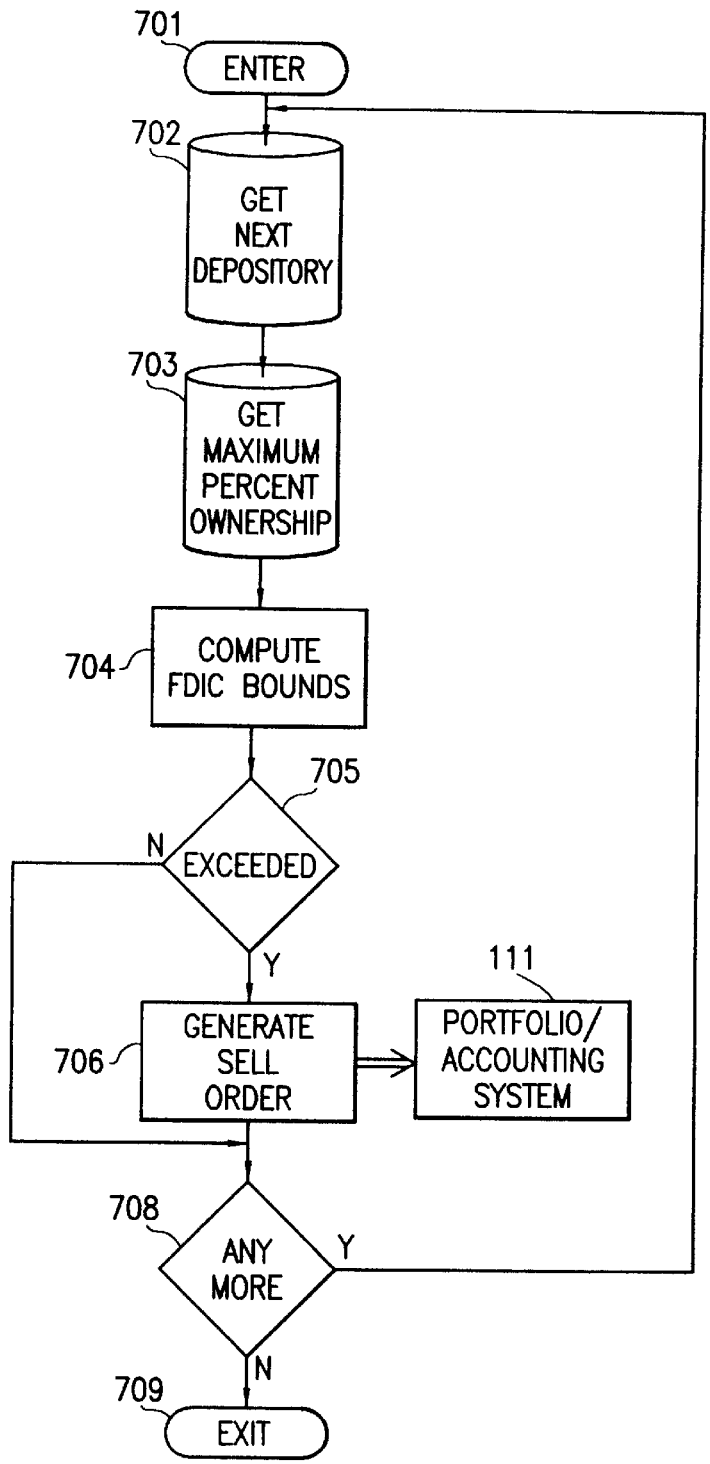
FIG. 7 is a flowchart depicting bidding means processing.

A detailed description of the bidding means is depicted in FIG. 7. Bidding means processing begins at block 801 and ends at block 806, after which the system proceeds to the next sequential process. Beginning with a storage area fetch at block 802, the system proceeds through block 805 to implement a scan of all depository areas stored in disk storage 103. For each depository area, process steps at blocks 803 to 804 are performed.

At block 803, preferably by means of a telecommunications link (or alternatively by tape, manual, or other data exchange means), all depositories at which the benefit structure places deposits are queried for the terms of the deposit contracts currently being offered. Each depository responds with its most favorable deposit terms, for either fixed rate or indexed FDIC insured deposit contracts. The benefit structure, being a large depositor, will benefit from more favorable offers than individual subscribers could obtain. This data updates the depository storage area at block 804 for use in the next process step.

Figure 8:
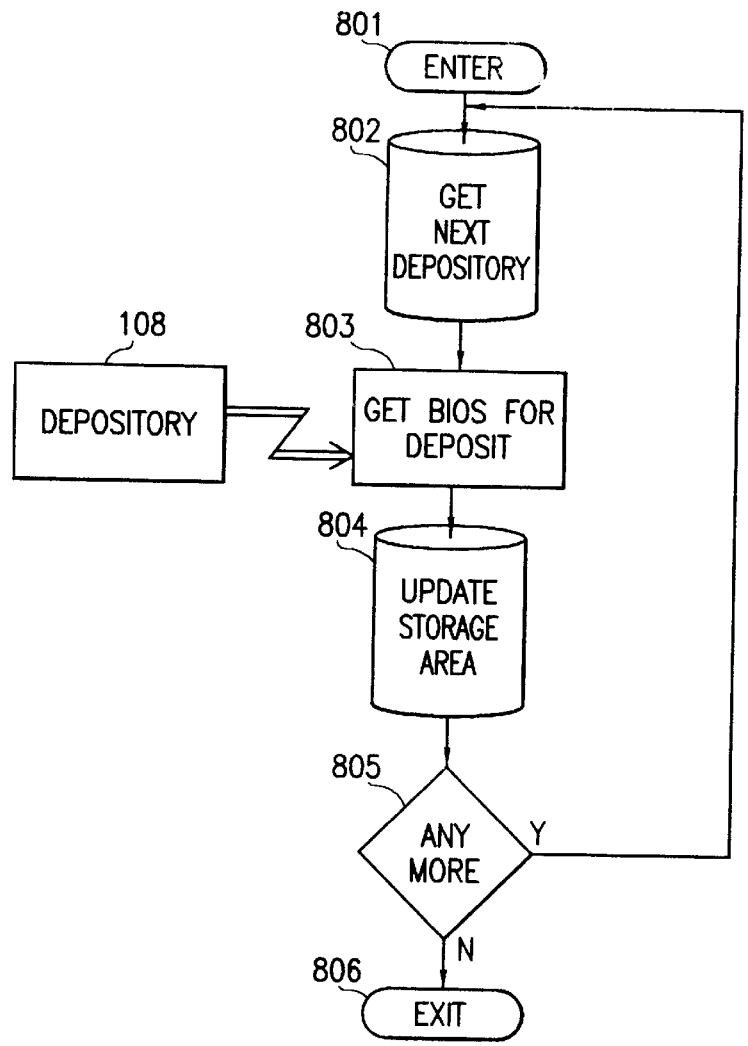
FIG. 8 is a flowchart depicting investing means processing.

A detailed description of the investing means is depicted in FIG. 8. Investing means processing begins at block 901 and ends at block 905, after which the system proceeds to the next sequential process. At block 902, the system fetches from disk storage 103 the deposit contract offers of all depositories, which were previously stored by the bidding means at block 804. At block 903, the system sorts these in an order of attractiveness. For example, this may be in order of expected yield, as determined by the contract offer terms and interest rate forecast for future years. Computing such expected yield is a process well known in the financial arts. If no funds are available, as indicated at block 904, the investing process exits at block 905.

If funds are available, the next best deposit offer is selected at block 906 from the list generated at block 903. By a process identical to that detailed for the depository monitoring means, the subprocess indicated at block 907 checks to assure that, after investment in this offer, the FDIC limit will be met for this depository. If not, the process loops to try again at block 904. If so, then at block 908 the system generates data representing a deposit contract buy order. This buy order data is transferred to portfolio & accounting system 111 to carry out this financial action. The available funds are decremented at block 909. The process loops to try additional investment at block 904.

Figure 9:
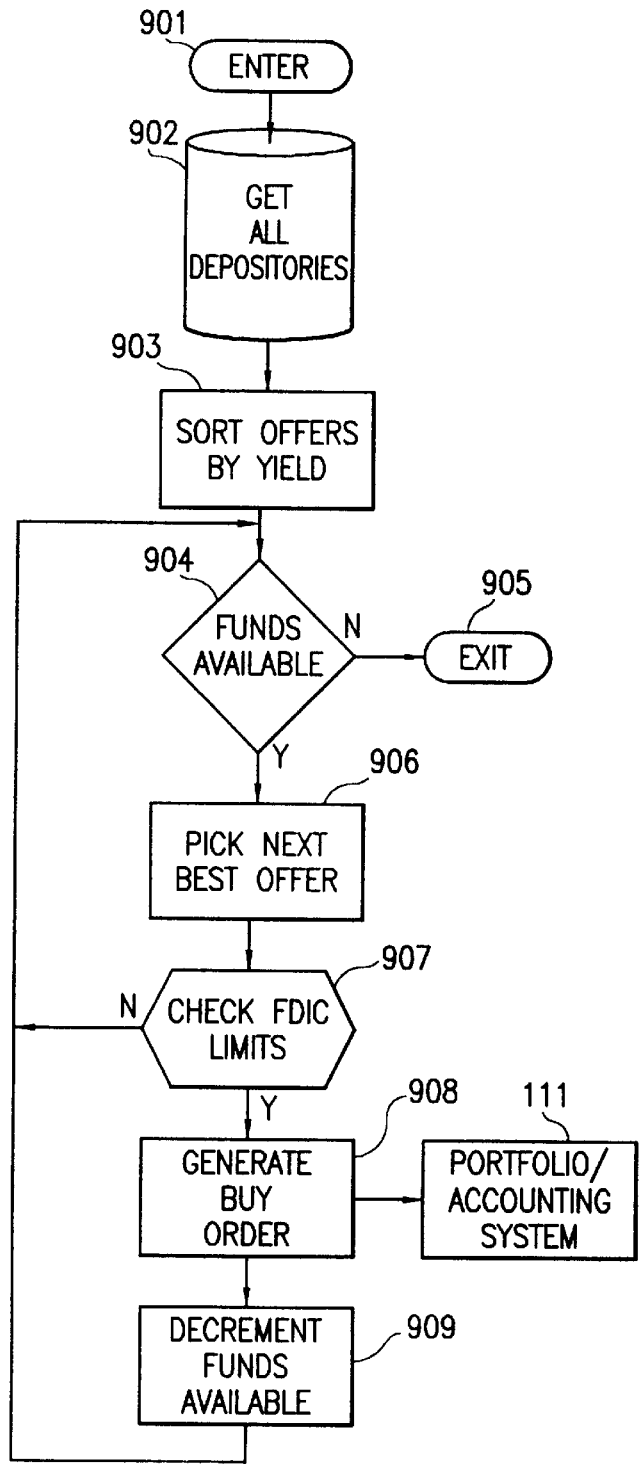
FIGS. 9 and 9A are flowcharts depicting reporting means processing and the processing of each report.

A detailed description of the reporting means is depicted in FIG. 9. Reporting means processing begins at block 1001 and ends at block 1007, after which the system exits from its processing for this period, as indicated in FIG. 2 at block 212. Subprocess steps at blocks 1002 to 1006 generate reports on all entities stored by the system in disk storage 103. These entities are listed in Table 1.

Figure 9A:
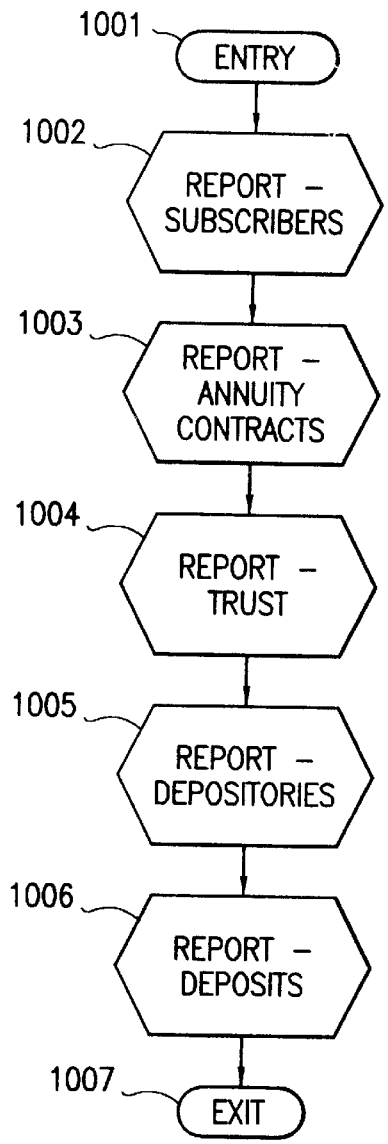

FIG. 9A details these report subprocesses, one for each type of entity. They begin processing at block 1008 and exit at block 1016. Beginning with a storage area fetch at block 1009, the system proceeds through block 1015 to implement a scan of all storage areas of the particular entity stored in disk storage 103. At block 1010, the system generates exception reports requiring immediate auditing or administrative attention. For example, exception conditions for subscribers may include a missed annuity premium; for depositories, an out of balance condition, etc. For the correct date, which may be weekly, quarterly, yearly, etc., at block 1013 the system generates detail reports, for example listing all entity instances, and summary reports, for example providing totals of various quantities of interest.

While it is apparent that the invention herein disclosed is well calculated to fulfill the objects above stated, it will be appreciated that numerous modifications and embodiments may be devised by those skilled in the art and it is intended that the appended claims cover all such modifications and embodiments as fall within the true spirit and scope of the present invention.

I claim:

1. A computer-based transactional system for managing an insured investment account structure including one or more annuity contracts, each of the annuity contracts being owned by one or more individual beneficiaries and being paid for by one or more subscribers, premiums paid for the annuity contracts being invested in one or more depository accounts consisting of deposit contracts, insured by deposit insurance, at one or more financial institutions, said system comprising:

computer processor means for processing data;

storage means, coupled to said processor means, for storing data on a storage medium;

depository monitoring means, coupled to said processor means and said storage means, for processing data representing the depository accounts insured by deposit insurance and for ensuring that deposit insurance requirements are met for all depository accounts and all beneficiaries; and payment tracking means, coupled to said processor means, said storage means and said depository monitoring means, for inputting data representing all transactions of the investment account structure and for computing ownership of a share of the investment account structure of each of one or more beneficiaries of each annuity contract;

reporting means coupled to said processor means and said storage means for processing data and providing human readable reports on the subscribers, beneficiaries, annuity contracts, participating financial institutions, and depository accounts; and, bidding means, coupled to said processor means and said storage means, for inputting and processing data representing the depository accounts being offered by the participating financial institutions;

said depository monitoring means including means for determining whether each ownership share of each depository account for each of said beneficiaries exceeds said deposit insurance and means to redeem deposit contracts to ensure that said deposit insurance requirements are met for all depository accounts and all beneficiaries and to invest in additional deposit contracts so that insurance requirements are met for the investment account structure for all beneficiaries in all participating depository institutions.

2. A system as claimed in claim 1, wherein said payment tracking means processes data representing premium payments from each subscriber and annuity payments made to each beneficiary and data representing interest payments from and principal payments from and to the depository institutions in order to activate said means to redeem and to invest so that insurance requirements are met for the investment account structure for all beneficiaries in all participating institutions.

3. A computer-based transactional system for managing an investment account structure including one or more life insurance contracts, each of the life insurance contracts being owned by one or more individual subscribers for the benefit of one or more beneficiaries, premiums paid for the life insurance contracts being invested in one or more depository accounts consisting of deposit contracts for the benefit of said beneficiaries, insured by deposit insurance, at one or more financial institutions, said system comprising;

computer processor means for processing data;

storage means, coupled to said processor means, for storing data on a storage medium;

depository monitoring means, coupled to said processor means and said storage means, for processing data representing the depository accounts and for ensuring the deposit insurance requirements are met for all depository accounts and all beneficiaries; and payment tracking means, coupled to said processor means, said storage means and said depository monitoring means, for inputting data representing all transactions of the investment account structure and for computing ownership of a share of the investment account structure of each of one or more beneficiaries of each annuity contract;

reporting means, coupled to said processor means and said storage means, for processing data and providing human readable reports on the subscribers, beneficiaries, life insurance contracts, participating financial institutions, and depository accounts; and, bidding means, coupled to said processor means and said storage means, for inputting and processing data representing the depository accounts being offered by the participating financial institutions;

said depository monitoring means including means for determining whether each ownership share of each depository account for each of said beneficiaries exceeds said deposit insurance and means to redeem deposit contracts to ensure that said deposit insurance requirements are met for all depository accounts and all beneficiaries and to invest in additional deposit contracts so that insurance requirements are met for the investment account structure for all beneficiaries in all participating institutions.

4. A system as claimed in claim 3, wherein said payment tracking means processes data representing premium payments from each subscriber and life insurance payments to each beneficiary and data representing interest payments from and principal payments from and to the depository institutions in order to activate said means to redeem and to invest so that insurance requirements are met for the investment account structure for all beneficiaries in all participating institutions.

5. A computer-based transactional system for managing an insured investment account structure including one or more irrevocable trusts, each of the irrevocable trusts being funded by one or more individual subscribers and designating income beneficiaries and surviving residuary beneficiaries, with each subscriber's principal and/or income funds placed in a trust corpus in one of the irrevocable trusts, said principal and income funds being invested in one or more depository accounts consisting of deposit contracts, insured by deposit insurance, offered by one or more participating depository institutions, said system comprising;

computer processor means for processing data;

storage means, coupled to said processor means, for storing data on a storage medium;

depository monitoring means, coupled to said processor means and said storage means, for processing data representing the depository accounts and for ensuring the deposit insurance requirements are met for all depository accounts and all income and residuary beneficiaries;

means for grouping and assigning income beneficiaries having similar actuarial characteristics into one of said designated irrevocable trusts, said means for grouping coupled to said processor means, said depository monitoring means, and said storage means;

payment tracking means, coupled to said processor means, said storage means and said depository monitoring means, for processing data representing all transactions of the investment account structure and for computing each income beneficiary's percentage ownership of the investment account structure;

trust payment means, coupled to said processor means, said storage means and said depository monitoring means and said payment tracking means, for computing, upon the death of each income beneficiary, the payments to each remaining income beneficiary from said one of the irrevocable trusts and for computing, upon the death of a last income beneficiary, the pro rata distribution to all residuary beneficiaries designated by each subscriber from said one of the irrevocable trusts;

reporting means, coupled to said processor means and said storage means, for processing data and providing human readable reports on the subscribers, beneficiaries, irrevocable trusts, participating depository institutions, and depository accounts; and, bidding means, coupled to said processor means and said storage means, for inputting and processing data representing the depository accounts being offered by the participating depository institutions;

said depository monitoring means including means for determining whether each ownership share of each depository account for each of said income beneficiaries exceeds said deposit insurance and means to redeem deposit contracts to ensure that said deposit insurance requirements are met for all depository accounts and all income beneficiaries and to invest in additional deposit contracts so that insurance requirements are met for the investment account structure for all income beneficiaries in all participating institutions.

6. A system as claimed in claim 5, wherein said storage means further comprises:

(a) means for initializing one or more areas in the storage medium to receive data representing each subscriber, each income beneficiary and each residuary beneficiary in each irrevocable trust, participating depository institution, and insured deposit contracts;

(b) means for inputting and storing data representing each subscriber, each income and residuary beneficiary for each irrevocable trust, each participating depository institution, and each insured deposit contract; and (c) means for initializing and maintaining an area in the storage means to receive data representing the financial state of the investment account structure.

7. A system as claimed in claim 6, wherein payment tracking means processes data representing funding payments from each subscriber and income payments to each income beneficiary and data representing interest payments from and principal payments from and to the depository institutions in order to activate said means to redeem and to invest so that insurance requirements are met for the investment account structure for all beneficiaries in all participating institutions.

8. A system as claimed in claim 7, wherein payment tracking means computes each income beneficiary's percentage ownership of the investment account structure by comparing the value of each subscriber's investment with the total value of the investment account structure and adding a pro rata share of said income funds from decedent income beneficiaries thereto.

9. A system as claimed in claim 8, wherein said trust payment means computes each trust's income from data representing the percentage each trust's principal represents with respect to the total value of the investment account structure and then computes each income beneficiary's income by dividing this trust income equally among all surviving income beneficiaries of this trust.

10. A computer-based transactional system for managing an insured investment account structure including one or more irrevocable trusts, each of the irrevocable trusts being funded by one or more individual subscribers and designating income beneficiaries and surviving residuary beneficiaries, with each subscriber's principal and/or income funds derived from one or more annuity contracts from said subscriber and placed in a trust corpus in one of the irrevocable trusts, said principal and income funds being invested in one or more depository accounts consisting of deposit contracts which are part of said annuity contracts, insured by deposit insurance, offered by one or more participating depository institutions, said system comprising;

computer processor means for processing data;

storage means, coupled to said processor means, for storing data on a storage medium;

depository monitoring means, coupled to said processor means and said storage means, for processing data representing the depository accounts and for ensuring the deposit insurance requirements are met for all depository accounts and all income and residuary beneficiaries;

means for grouping and assigning income beneficiaries having similar actuarial characteristics into one of said designated irrevocable trusts, said means for grouping coupled to said processor means, said depository monitoring means, and said storage means;

payment tracking means, coupled to said processor means, said storage means and said depository monitoring means, for processing data representing all transactions of the investment account structure and for computing each income beneficiary's percentage ownership of the investment account structure;

trust payment means, coupled to said processor means, said storage means and said depository monitoring means and said payment tracking means, for computing, upon the death of each income beneficiary, the payments to each remaining income beneficiary from said one of the irrevocable trusts and for computing, upon the death of a last income beneficiary, the pro rata distribution to all residuary beneficiaries designated by each subscriber from said one of the irrevocable trusts;

reporting means, coupled to said processor means and said storage means, for processing data and providing human readable reports on the subscribers, beneficiaries, irrevocable trusts, participating depository institutions, and depository accounts; and, bidding means, coupled to said processor means and said storage means, for inputting and processing data representing the depository accounts being offered by the participating depository institutions;

said depository monitoring means including means for determining whether each ownership share of each depository account for each of said income beneficiaries exceeds said deposit insurance and means to redeem deposit contracts to ensure that said deposit insurance requirements are met for all depository accounts and all income beneficiaries and to invest in additional deposit contracts so that insurance requirements are met for the investment account structure for all income beneficiaries in all participating institutions.

11. A system as claimed in claim 10, wherein said storage means further comprises:

(a) means for initializing one or more areas in the storage medium to receive data representing each subscriber, each income beneficiary and each residuary beneficiary in each irrevocable trust, participating depository institution, and insured deposit contracts;

(b) means for inputting and storing data representing each subscriber, each income and residuary beneficiary for each irrevocable trust, each participating depository institution, and each insured deposit contract; and (c) means for initializing and maintaining an area in the storage means to receive data representing the financial state of the investment account structure.

12. A system as claimed in claim 11, wherein payment tracking means processes data representing finding payments from each subscriber and income payments to each income beneficiary and data representing interest payments from and principal payments from and to the depository institutions in order to activate said means to redeem and to invest so that insurance requirements are met for the investment account structure for all beneficiaries in all participating institutions.

13. A system as claimed in claim 12, wherein payment tracking means computes each income beneficiary's percentage ownership of the investment account structure by comparing the value of each subscriber's investment with the total value of the investment account structure and adding a pro rata share of said income funds from decedent income beneficiaries thereto.

14. A system as claimed in claim 13, wherein said trust payment means computes each trust's income from data representing the percentage each trust's principal represents with respect to the total value of the investment account structure and then computes each income beneficiary's income by dividing this trust income equally among all surviving income beneficiaries of this trust.

* * * * *